United States Patent [19]
Martines et al.

[11] 3,829,752
[45] Aug. 13, 1974

[54] ELECTRONIC SYNCHRO DRIVE SYSTEM

[75] Inventors: Francis M. Martines, Lake Ronkonkoma, N.Y.; Philip K. Spahr, Nutley, N.J.

[73] Assignee: The Singer Company, Little Falls, N.J.

[22] Filed: Mar. 16, 1973

[21] Appl. No.: 342,066

[52] U.S. Cl.............................. 318/654, 340/347 SY
[51] Int. Cl. ............................................. G05b 6/02
[58] Field of Search ....... 318/654, 605; 340/347 SY

[56] References Cited
UNITED STATES PATENTS

| | | | |
|---|---|---|---|
| 2,969,534 | 1/1961 | Fisher............................ | 318/605 X |
| 3,083,908 | 4/1963 | Vaccardo........................ | 318/654 X |
| 3,508,129 | 4/1970 | Goldberg et al................ | 318/654 X |
| 3,662,379 | 5/1972 | Miller et al.................... | 340/347 SY |
| 3,763,414 | 10/1973 | Clarke............................ | 318/654 X |

*Primary Examiner*—B. Dobeck
*Attorney, Agent, or Firm*—T. W. Kennedy

[57] ABSTRACT

Described herein is an efficient, electronically damped drive system for a torque receiver synchro, which is to be randomly positioned at any one of several discrete positions. A coded input command is routed to a particular drive circuit, which corresponds to the location that the synchro is to be positioned. The drive system, through a pair of bi-directional, AC switches, connects a pair of windings of a multi-tapped transformer to each of the appropriate windings on the synchro. The windings of the multi-tapped transformer which are selected have voltages and phase relationship which are pre-determined and which correspond to the synchro winding excitation voltage required to position the synchro at the location identified with the coded input command. The drive circuitry includes a feature which upon reaching the desired position allows for the continuous application of the particular voltages to the appropriate synchro windings until positive reset action is initiated prior to an update in synchro position. Additionally, a unique electronic damping circuit is provided which "kicks" the synchro in discrete steps by providing a source of controlled drive pulses for the drive circuitry. The pulses are controlled as to number, frequency, and duty cycle so as to provide a smooth transition from one position to the next. After the "kick" pulses have smoothly repositioned the synchro, full energy is then automatically applied to the appropriate synchro windings so as to firmly lock the position of the synchro.

4 Claims, 4 Drawing Figures

ELECTRONIC SYNCHRO DRIVE SYSTEM

BACKGROUND OF THE INVENTION

This invention relates generally to electrical drive systems for electromechanical devices, but in particular to a more efficient drive system for a torque-receiver, synchro type, electro-mechanical device.

Frequently it is desired to convert the digital outputs from a computer to a visual representation. For example, the distance that an aircraft has to travel, or has travelled, is often displayed in the cockpit by a combination of decimally coded wheels. Each of these wheels has the numbers 0-9 inclusive imprinted thereon, and together may represent the units, 10's and 100's of the miles reflective of the distance travelled, or distance to go. Each of these wheels, through appropriate gearing, are connected to the electrical drive systems. These drive systems convert the digital data representative of the latest determination of distance and provide the appropriate drive voltage to the torque receiver synchros driving each of the wheels.

Since each of the wheels have symmetrically displayed thereon, 10 digits, the synchro, at update, must be positioned to one of those 10 locations. This depends, of course, on the particular coded input received. For a typical three winding torque-receiving synchro, the following equations give the actual voltages required for positioning the wheels at a given digit:

$$V_{S31} = N \, E_{r12} \sin \theta$$
$$V_{S23} = N \, E_{r12} \sin (\theta + 120°)$$
$$V_{S12} = N \, E_{r12} \sin (\theta + 240°)$$

where:

N is the turns ratio from stator to rotor
$\theta$ is the angle to which the synchro is to be positioned; would be 36° or some multiple for a 10 digit wheel $V_{sij}$ is the stator voltage between a given pair of stator windings.
$E_{r12}$ is the voltage across the synchro rotor windings Once the appropriate stator voltages are applied to the respective windings, the synchro positions itself at the corresponding location. In order to maintain this position, the stator excitation voltage must continuously be applied. When a given wheel is to be relocated to a different digit, the appropriate stator voltages reflective of that new position must be applied.

The prior art implementation of a drive system for this type of synchro includes a storage register, wherein the input digital data is entered and stored while the synchro is updated. In the updating process, the digital data is used to switch a source of ac power which, typically, in military airborne applications might have a frequency of 400 Hz, of proper phase into correspondingly weighted resistor inputs of a ladder network. In typical applications, wherein two stator windings are energized, two such ladder networks must be used for each synchro. The outputs of the two networks are then amplified in power amplifiers which then drive the stator windings of the torque receiver synchro. This step repositioning of the torque receiver in the prior art does impose some rather demanding requirements on surge power to be delivered to the torque receiver. Because of the implementation described, the surge power required must be supplied directly from the power amplifier. It has been conservatively estimated that a combined efficiency of the power supplies used to power these amplifiers and the amplifiers themselves is on the order of 0.6. Therefore, where torque receivers having impedance characteristics typical in most military applications are used, a surge power demand from the 400 Hz line could be as large as 55 watts rms. Therefore, a prime source of concern must be the need for power supplies to provide this magnitude of power in a practical situation. Also, of key concern is the size, weight and cost of the power amplifiers sufficiently rated to perform the job as indicated above.

Additionally, in making the transition from one location on the wheel to a second location upon receipt of the step command to change position, normally the angular velocity and moment of inertia of the wheel mechanism will be sufficient to carry the wheel, initially, through its new position. The wheel will tend to oscillate in a damped fashion about this new position, until finally settling at the new position within a period of time. This time to settle is a measure of a system's damping.

In the prior art, damping of a sort was accomplished by utilizing series resistors in each of the stator windings. Although appropriate damping would be achieved using this technique, the approach results in an accompanying loss of restoring torque; that is to say, the wheel once positioned is not firmly locked in that position due to the loss of power in the series resistors. As a consequence, under the severe vibrational requirements of airborne electronic equipment, a disturbing jitter occurs in the wheel display which can be quite bothersome to the pilot.

SUMMARY OF THE INVENTION

It is, therefore, an object of this invention to provide a low-power, less complex, more reliable synchro drive circuit.

It is a further object of this invention to provide a synchro drive circuit which eliminates the need for, first an AC to DC conversion, and then a DC to AC conversion to effect the powering of the stator winding of the synchro.

In particular, it is an object of this invention to provide a wheel drive circuit which connects the appropriate windings of a multi-tapped transformer to the synchro stator leads through low power bi-directional AC switches.

It is still a further object of this invention to provide a wheel drive circuit which includes a damping circuit that alternately energizes and de-energizes the stator winding by a series of control pulses of AC power, which effects a smooth transition to the desired position with a minimum of overshoot and which results in full energy being applied to the stator windings once the synchro has reached its desired position.

Herein below is described a new technique for repositioning torque receiver synchro motors in response to a change in input data which involves connecting a particular set of AC voltages of suitable phase and magnitude directly to the stator leads of said synchro motor, through a set of bi-directional, AC switches. The input data is processed through a unique electronic circuit which dampens the interposition motion of the synchro by controlling the application of the AC voltages to the stator leads such that the AC voltage is alternately connected and disconnected to the stator leads. This results in a pulse torquing of the synchro, thereby effecting the necessary damping. The electronic circuit is configured such that when the synchro is repositioned to correspond to the present set of input data, the bidirectional switches are maintained in the "on" position resulting in continuous application of the AC voltages and thereby firmly locking the position of the synchro until the input data is revised.

DESCRIPTION OF A PREFERRED EMBODIMENT

Figure 1:
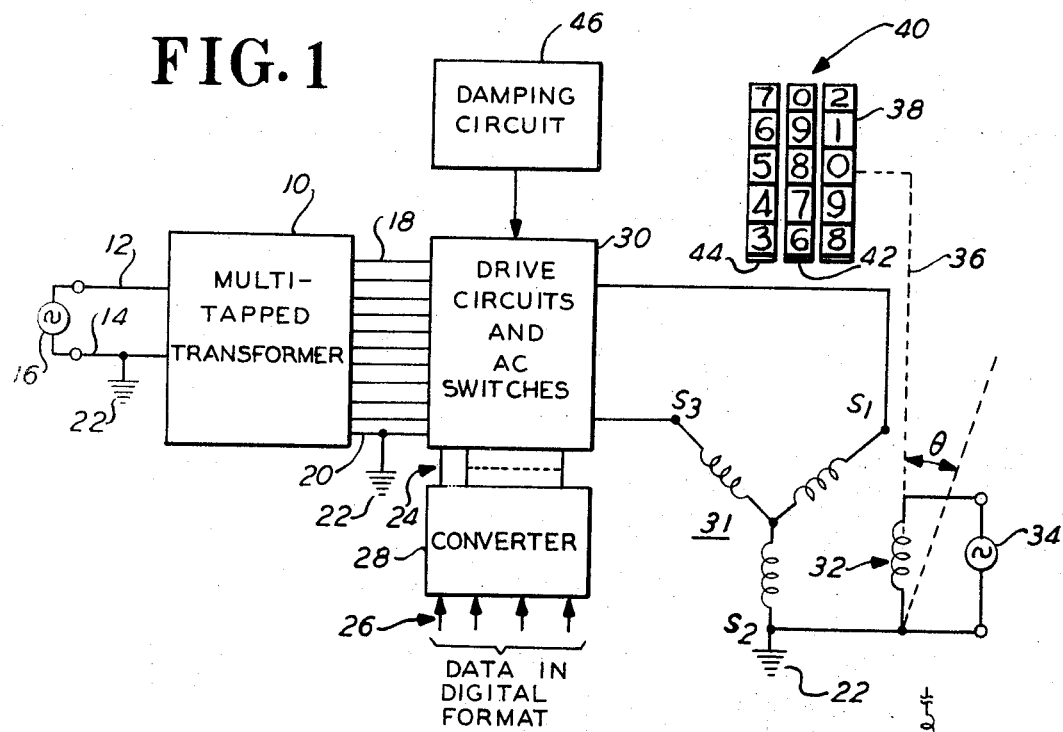
FIG. 1 — a functional diagram depicting the operation of the invention.

Referring to FIG. 1, there is shown a multi-tapped transformer 10, having primary winding input leads 12, 14, connected to an AC voltage source 16. The AC voltage source 16, for military airborne applications, might typically be 26 volts rms, 400 Hz voltage source. For purposes of this embodiment, multi-tapped transformer 10, may have a plurality of secondary windings 18 which provide the necessary voltages for the purposes hereinafter described. Additionally, a common, secondary return lead 20 is provided which is connected to the system ground 22.

Data in digital format is received from the on-board computer on input lines 26. The data is fed into a standard converter which may be a binary to decimal converter 28, which outputs on lines 24, a code representative of the decimal equivalent of the received digital data. In our illustration, the decimal equivalents of the units, 10's and 100's of an aircraft's "distance to go" would be available on respective groupings of lines within the lines represented as 24.

Depending on the particular digit represented by the group of lines corresponding to the units, to the 10's, and to the 100's, etc., a particular drive circuit in block 30 would be activated which in turn connected or activated the appropriate AC switch within block 30 to connect the corresponding secondary winding of multi-tap transformer 10 to the S3 and S1 windings of stator windings 31. The voltages applied to the stator windings S1 and S3 for a particular digit and for 26V rms, 400 Hz applied to rotor winding 32 as determined by the aforementioned equations would be in accordance with the following table.

| Decimal | S1 | | S3 | |
|---|---|---|---|---|
| 0 | 10.2188 | $\underline{/180°}$ | 10.2188 | $\underline{/180°}$ |
| 1 | 11.741 | $\underline{/180°}$ | 4.8026 | $\underline{/180°}$ |
| 2 | .7674 | $\underline{/180°}$ | 2.4544 | $\underline{/0°}$ |
| 3 | 2.4544 | $\underline{/180°}$ | 8.7674 | $\underline{/0°}$ |
| 4 | 4.8026 | $\underline{/0°}$ | 11.741 | $\underline{/0°}$ |
| 5 | 10.2188 | $\underline{/0°}$ | 10.2188 | $\underline{/0°}$ |
| 6 | 11.741 | $\underline{/0°}$ | 4.8026 | $\underline{/0°}$ |
| 7 | 8.7674 | $\underline{/0°}$ | 2.4544 | $\underline{/180°}$ |
| 8 | 2.4544 | $\underline{/0°}$ | 8.7674 | $\underline{/180°}$ |
| 9 | 4.8026 | $\underline{/180°}$ | 11.741 | $\underline{/180°}$ |

The third synchro winding, S2, is returned to system ground 22. The rotor winding 32 of the synchro is connected to an AC voltage source 34, which is frequency synchronized with source 16, and which typically, may be the same AC voltage source as source 16. The rotor (not shown) through appropriate gearing 36 mechanically drives one wheel 38, of the composite grouping of wheels, 40. The other wheels 42 and 44, will be driven in a similar manner. Together, the numerical read out displayed will be the decimal equivalent of the digital data received on input lines 26 and might, as suggested above, represent the "distance to go" of a particular flight.

A damping circuit 46 is functionally shown, which operates on the particular voltages to be applied to the stator windings so as to provide a damping effect on the transpositional movement of wheel 38, to thereby prevent undesirable oscillation of the wheel 38 when it arrives at a given digit.

Figure 2:
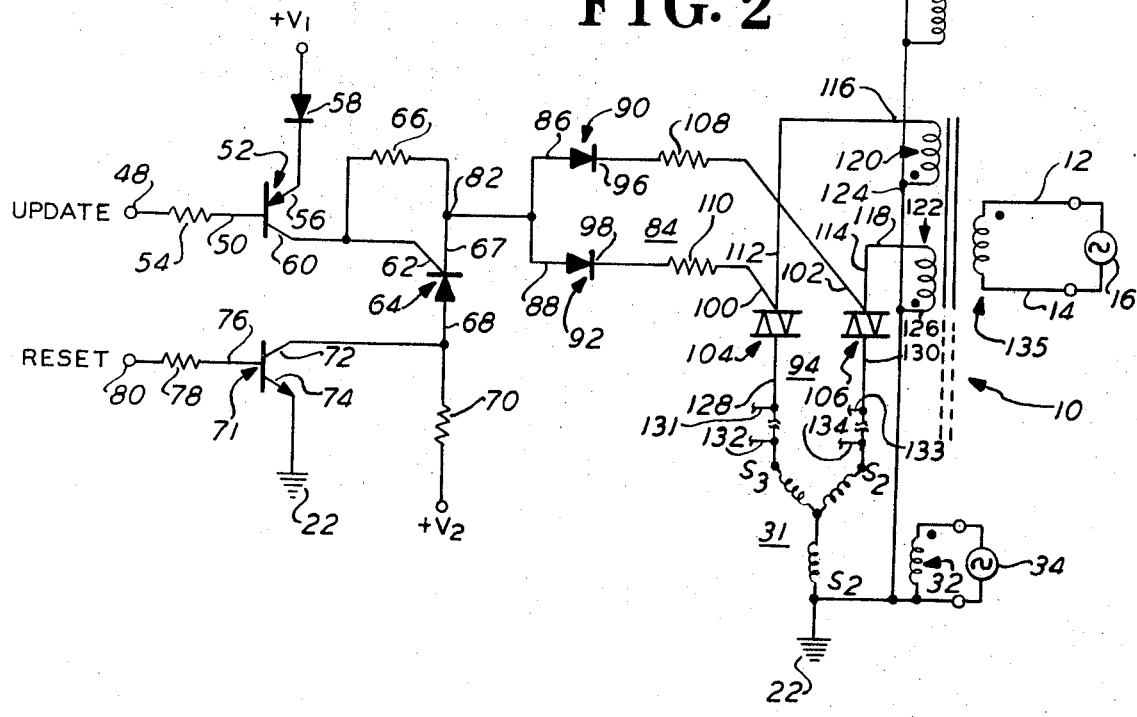
FIG. 2 — a schematic diagram of the drive circuit interconnected with the AC switches.

Referring to FIG. 2, we will hereinafter describe a typical drive circuit and AC switch combination, as represented by block 30 in FIG. 1, suitable for effecting the purposes of this invention. The input 48 to the drive circuit is connected to base 50 of transistor 52 through base drive resistor 54. The emitter 56 of PNP transistor 52 is connected to the cathode of diode 58, which has its anode connected to a positive, d.c. supply, $V_1$. Diode 58 ensures that transistor 52 turns off for a logic 1 state at input 48. The supply voltage $V_1$ preferably will be of a value suitable to allow operation of the circuit with a binary to decimal converter utilizing standard digital logic circuitry, such as DTL logic. The collector 60 of transistor 52 is connected to the gate 62, of silicon controlled rectifier (SCR) 64.

Leakage current return resistor 66 is connected between the gate 62 and the cathode 67 of SCR 64. This resistor 66 by shunting junction leakage current prevents unwanted "turn-on" of the SCR 64 when the circuitry is submitted to temperature extremes. Anode 68, is connected through load resistor 70 to a second, positive, DC supply, $V_2$. The value of resistor 70, is selected to insure that the "holding current" of the SCR is available when the SCR is gated on.

The junction between anode 68 and resistor 70 is shunted to ground 22, through NPN transistor 71. The collector 72, of transistor 71 is connected to the aforesaid junction. Emitter 74 is connected to system ground 22. The base 76 is connected to a reset input 80 through base drive resistor 78.

The junction 82, of cathode 67 and resistor 66 is connected to a pair of gate drive circuits 84. In particular, the anodes 86 and 88 of diodes 90 and 92 respectively, are connected together and, in turn, connected to the junction 82. The diodes are used to isolate cathode 67 from the possibility of reverse current flowing from the AC switch network 94 towards the cathode 67. Cathodes 96 and 98 are connected to the gates 100 and 102 of bi-directional switches 104 and 106 through gate drive resistors 108 and 110.

The AC switches preferably are solid state type switches which preferably may be triac type switches. Triacs are essentially two SCR's in one package which allow for the passage of current in both directions, provided the gate voltage is continuously applied. The anodes 112 and 114 of triacs 104 and 106 are connected to the "high" side 116 and 118 of transformer secondary windings 120 and 122. The "low" sides 124 and 126 of secondary windings 120 and 122 are connected together, along with the "low" sides of the remaining secondary windings of transformer 10, and, together, are connected to system ground 22. Assuming for the moment that the digit to be represented on wheel 38 is a "zero," in accordance with the above table the voltage appearing across each of the secondary windings 120 and 122 would be 10.2188 /180°. The second anodes 128 and 130 are connected to the stator windings S3 and S1.

The common points between second anodes 104 and 106 and stator windings S3 and S1 are connected to the triac switches of the other similar drive circuits via leads 131, 132, 133 and 134. Transformer high sides 135, 136 would go to the first anodes of their associated triac switches.

The input leads 12 and 14 are energized as described above by AC voltage source 16. Of course, the turns ratio between the primary winding 135 and each of the secondary windings 120, 122, etc. are such as to result in the voltages identified in the above table being available at designated windings.

In operation, assuming that the digital data has been converted or decoded into a suitable format which calls for the application of the voltages appearing on secondary windings 120 and 122 to the stator windings S3 and S1, the appropriate logical level will occur at the update input 48. For purposes of this particular circuit design, that logical level would be nominally a zero volt level. Transistor 52 turns on in response to that zero level. Current flows from $V_1$ through diode 58 and through transistor 52 into the gate 62 of SCR 64. SCR 64 thus, is turned on, allowing for current to flow from power supply $V_2$ through resistor 70 through the SCR 64 and into the gate drive circuits 84.

The gate drive current flowing into the gate drive networks 84, is sufficient to turn on bi-directional switches 104 and 106. With continuous application of the respective gate drive currents, triacs 104 and 106 are maintained "on" for both half cycles of the AC voltages appearing on secondary windings 120 and 122. Since one of the characteristics of the bi-directional switch is a low voltage drop in the conducting position, virtually all of the secondary voltage appearing across windings 120 and 122 is seen across stator windings S3 and S1 respectively. In response to the torque developed between the voltages appearing across the stator windings and the voltage appearing across the rotor winding 32, the rotor of the synchro rotates to that position corresponding to the particular digit. Once SCR 64 has been turned on, it will remain on until input level at 48 goes high and a reset pulse is received at input 80. This insures that switches 104 and 106 remain "closed," so as to apply full voltage to the stator windings S3 and S1. This results in full energy being applied to S3 and S1 when the wheel is positioned in its final location.

Periodically, the wheel must be repositioned. Before this can happen, one drive circuit, AC switch network must be removed and stator windings S3 and S1 connected to anotheer such network. At this time, a reset pulse is applied to input 80, of sufficient voltage level, to turn on transistor 71. This shunts the anode 68 of SCR 64 to system ground 22, such that the "holding current" is now shunted through the transistor 71. SCR 64, therefore, is turned off. Consequently, there is no gate drive current available for switches 104 and 106, so that they, in turn, are turned off.

Figure 3:
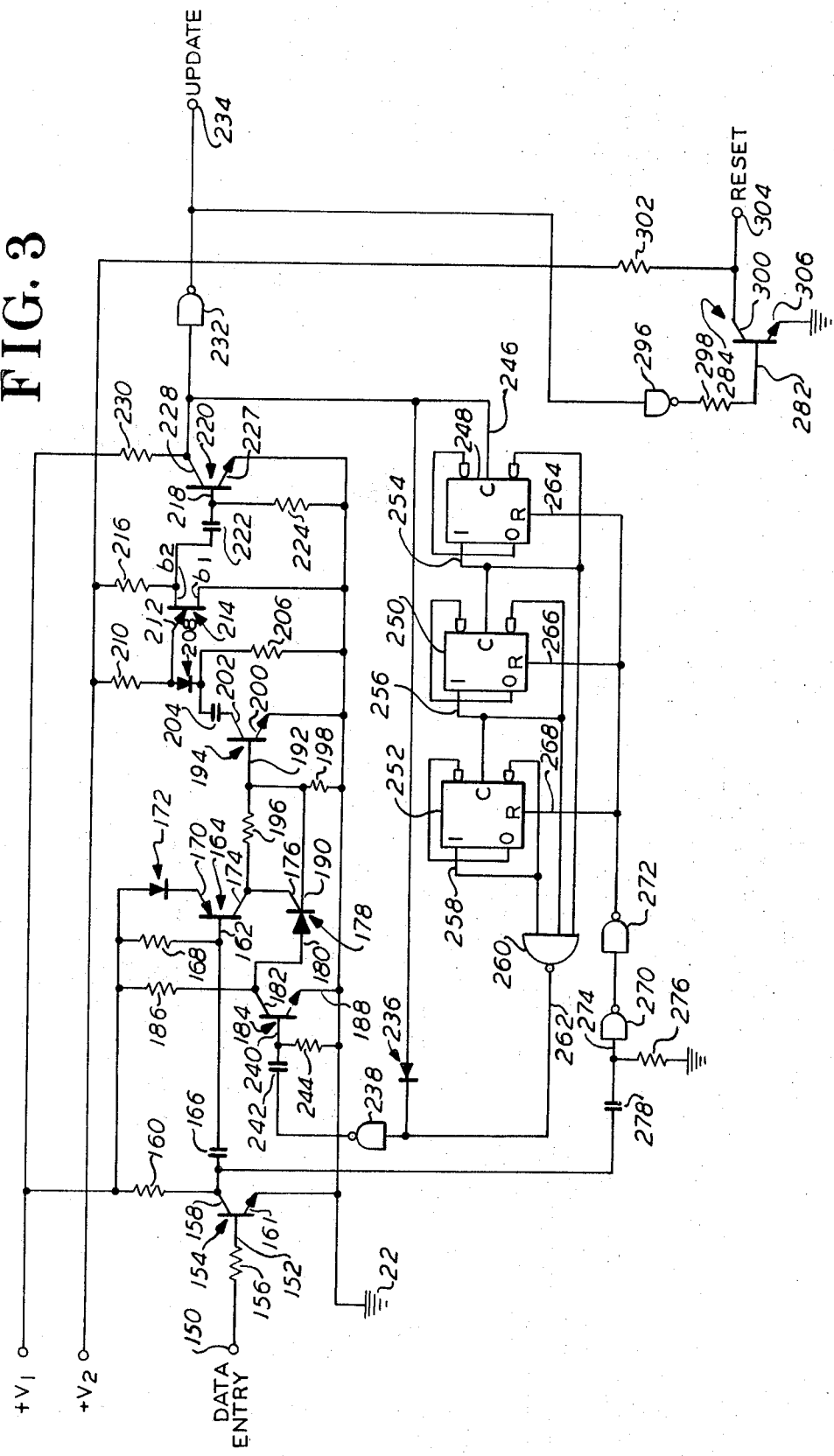
FIG. 3 — a schematic diagram of the damping circuit which forms part of the invention.

Referring now to FIG. 3, there is shown a circuit suitable for effecting the transpositional movement of the rotor without the overshoot manually associated therewith. This particular configuration would be interposed between the data received on lines 24 and the update and reset terminals of FIG. 2. Depending on data input format and updating rates, logic circuitry could easily be designed to allow for it to be multiplexed to all three wheels for a further economy of hardware.

An input data entry pulse from converter 28 is received at input terminal 150. This terminal is connected to the base 152 of NPN transistor 154 through base drive resistor 156. The collector 158 is connected to a positive DC supply $V_1$, through resistor 160. Emitter 161 is connected to system ground 22.

Collector 158 is connected to the base 162 of PNP transistor 164 through coupling capacitor 166. The base 162 of transistor 164 is shunted by a timing resistor 168, the other end of which is connected to supply $V_1$. The emitter 170 is connected through compensation diode 172 to the same power supply, $V_1$. Collector 174 is connected to the gate 176 of SCR 178.

Anode 180 of SCR 178 is connected to the collector 182 of NPN transistor 184. The collector-anode junction 182–180, is connected to supply $V_1$ through load resistor 186. The emitter 188 of transistor 184 is connected to system ground 22.

Cathode 190 of SCR 178 is connected to the base 192 of NPN transistor 194. Leakage bypass resistor 196 is connected between the junction of gate 176 and collector 174 and the base 192 of transistor 194. Base leakage resistor 198 shunts the base 192 to system ground 22.

The emitter 200 of transistor 194 is connected to system ground. The collector 202 connects to one side of capacitor 204. The opposite side of capacitor 204 is connected to the cathode of diode 208 and to system ground 22 through resistor 206. The anode of diode 208 is connected to a second positive, DC supply, $V_2$ through resistor 210. The junction formed by anode 208 and resistor 210 is connected to the emitter 212 of unijunction transistor 214. Capacitor 204, resistors 206 and 210, together with unijunction transistor 214 form a relaxation-type oscillator, the function of which will be described hereinafter.

Base $b_1$, of unijunction transistor 214 is connected to ground 22. Base $b_2$, of 214 is connected to supply $V_2$ through resistor 216 and additionally, is coupled to the base 218 of new transistor 220 through capacitor 222. Base 218 is shunted to ground 22 by resistor 224 which, together with resistor 216 and capacitor 222 determine the duration of the pulses generated by the previously mentioned relaxation oscillator. The emitter 229 of transistor 220 is returned to ground 22. The collector 228 is connected to supply $V_1$ through resistor 230 and to the input of inverting gate 232. The output of gate 232 is connected to the output terminal 234 which, as described above, would be multiplexed to the particular drive circuit-AC switch combination necessary to position wheel 38 at the digit represented by the digital input data.

The output appearing at collector 228 is fed back through diode 236 to the input of inverter 238. The output of inverter 238 is connected to the base 240 of transistor 184 through capacitor 242. Timing resistor 244 shunts the base 240 to ground 22.

Further, collector 228 is connected to the clock input 246 of flip flop (FF) 248. FFs 248, 250, and 252 are interconnected in a well known manner to form a ripple through counter, which for purposes of this illustration is shown as having three stages. The logical "one" outputs 254, 256, and 258 of flip flops 248, 250 and 252 respectively, are connected to the three inputs of NAND gate 260. The output 262 of gate 260 is also connected to the input of inverter 238.

The reset inputs 264, 266, and 268 of the above FF's are commoned together and connected to the output of serially connected inverting gates 270 and 272. The input 274 of the serially connected gates is connected to ground through resistor 276 and to the collector 158 of transistor 154 through capacitor 278.

The output of gate 232 is also connected to the base 282 of reset transistor 284 through an inverting gate 296 and serial connected resistor 298. The collector 300 of transistor 284 is connected through resistor 302 to supply $V_2$ and output terminal 304. The emitter 306 of transistor 284 is connected to system ground 22.

The object of the circuit of FIG. 3 is to provide a series of bursts of energizing voltage to the stator windings $S_1$ and $S_3$. In this way, the torque receiver is alternately energized and de-energized. By carefully controlling the number of bursts, the frequency of the bursts and also the duty cycle it is possible to "kick" the wheel 38, in discrete steps and relatively smooth fashion, to its new position. The circuit of FIG. 3 operates as follows:

The updated data input pulse appears on data entry terminal 150 in the form of a positive going pulse. In response to this pulse, the base 152 of transistor 154 goes "high," thus turning transistor 154 on. In response to the turn on of transistor 154 the voltage at the collector 158 is a negative going pulse, which is applied to the base 162 of transistor 164 to thereby turn the latter transistor on. When conducting, transistor 164 provides the gate drive current for SCR 178, thereby turning it on. The "holding current" for SCR 178 is supplied to the anode 180 of SCR 178 through resistor 186. The time constant formed by capacitor 166 and resistor 168 is sufficient to insure that transistor 164 is maintained in the "on" condition for the period of time necessary to insure that SCR 178 is brought into the conducting state. The voltage at base 162 of transistor 164 eventually returns to the $V_1$ level so that transistor 164 turns "off." Because of the nature of the device, however, SCR 178 continues to conduct even after transistor 164 has been turned "off."

The "holding current" for the SCR 178 provides the base drive current for transistor 194, so that when SCR 178 is conducting transistor 194 will be driven into its "on" state. This immediately drops the side of capacitor 204 which is connected to the collector 202 close to ground potential. Since prior to the turning on of transistor 194, the voltage across capacitor 204 was zero volts, and since the voltage across capacitor cannot change instantaneously, the voltage on the opposite side of capacitor 204 at the time of turn on of transistor 194 is also close to ground potential.

Diode 208 is basically included to compensate for the forward voltage drop across the emitter, 212 – base $b_1$ of the unijunction transistor 214. This is required, so that temperature changes cause a minimum change in the pulse timing generated by the UUT.

Immediately after the turn on of transistor 194 the voltage at the junction of resistor 210, the anode of diode 208 and the emitter 212 of unijunction transistor 214 begins to rise to a final value determined by the voltage divider action formed by resistors 206 and 210 with regard to supply voltage $V_2$. The time constant for this rise is likewise controlled by the Thevenin equivalent of resistors 206 and 210 and capacitor 204. When the voltage at the junction of resistor 210 and diode 208 reaches the threshold voltage of unijunction transistor 214, the unijunction transistor turns "on" thereby quickly discharging capacitor 204 and dropping the voltage at the junction of resistor 210 and the anode of diode 208 below the turn off level of the unijunction 214. Capacitor 204 again charges towards the turn on voltage of unijunction 214, reaches that level resulting in 214 again turning on to drop the voltage level below the turn off level of the unijunction transistor 214, etc. Thus, the frequency of oscillation of this form of relaxation oscillator is controlled by capacitor 204, and resistors 206 and 210, and the pulse width is determined by capacitor 204 and the emitter-base, $b_1$ resistance of unijunction 214. At the base $b_2$ of unijunction 14 a pulse train is formed having a frequency identical to the oscillation frequency just described.

This pulse train is capacitively coupled to the base 218 by capacitor 222 and resistor 224. In response to the pulse train applied to the base of transistor 228, the signal at the collector 228 of transistor 220 is also in a pulse train format.

The pulses appearing at the collector 228 are fed to the clock input 246 of FF248 of the ripple counter. As configured in the drawing, the particular counter would count eight pulses before all the inputs to NAND gate 260 were at the logical "one" level resulting in a change of state at the output 262 of gate 260. At that transition point, the particular voltage level at the anode of diode 236, which is connected to the collector 228, is a logical "zero" as is the logic level at the output 262, viz, a logical "zero." This causes NAND gate 238 to have an inversion at its output from a logical "zero" to a logical "one" level. This positive step occurring at the output of gate 238 is capacitively coupled to the base 240 of transistor 184 to turn it on. This shunts the "holding current" which had been flowing through SCR 178 down through transistor 184 to ground. SCR 178 thereby turns off, removing the base drive current being supplied to transistor 194. Transistor 194 turns off, with the result that the voltage at the junction of resistor 210 and the anode of diode 208 raises to a level sufficient to maintain unijunction transistor 214, continuously in the "on" position.

With unijunction transistor 214 now continuously in the "on" condition, transistor 220 is maintained in the "off" condition. Therefore, a logical "one" level, or $V_1$ volts, is applied to the input of inverting gate 232. This results in a logical "zero" at the output terminal 234 and likewise the input terminal 48 of the typical drive circuit described above. This insures that the appropriate secondary winding voltages are continuously applied to the corresponding stator windings as described above.

Since the circuit of FIG. 3 is multiplexed to the various drive circuits associated with a particular wheel, a reset function must be provided. The ripple counter and the particular drive circuit which is being energized must both be reset — the former to a zero count condition and the latter to an off state — before the update output 234 is multiplexed to another drive circuit.

Figure 4:
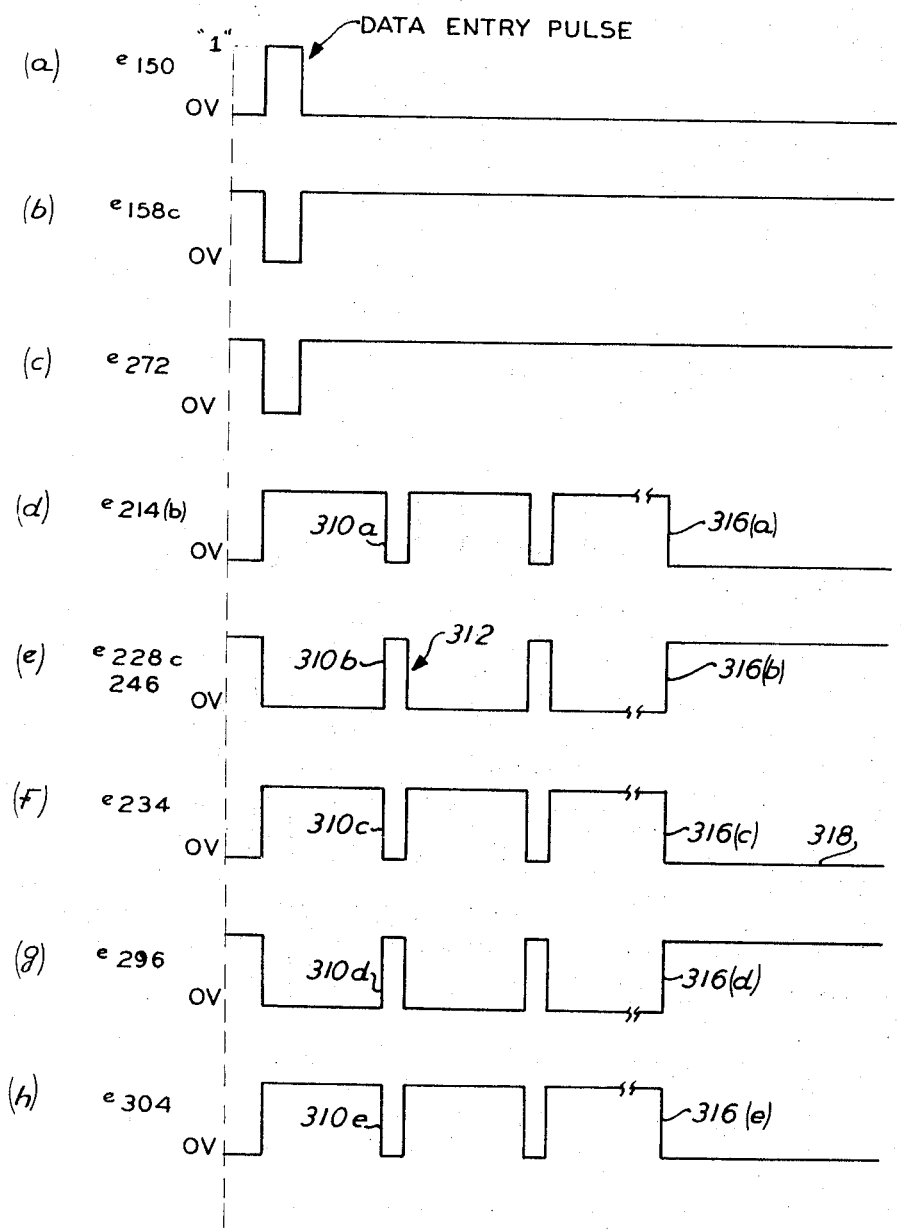
FIG. 4 — graphical representation of signals at various points of FIG. 3.

FIG. 4(a) shows the input data entry pulse being received at terminal 150. This is generated in converter 28 when new input data is received. FIG. 4(b) shows this pulse being inverted at the collector 158 of transistor 154. This inverted pulse is capacitively coupled by capacitor 278 to the serially connected pair of inverters, 274 and 272. FIG. 4(c) shows this pulse as it appears at the reset terminals, R, for each of the flip flops. This pulse resets the counter and thus conditions it to start the next count when the leading edge 310(b) of pulse 312, see FIG. 4(e), is received at the clock input 246.

Tracing the signal through FIG. 3, when the positive going transition is received at input terminal 150 the signal level at update terminal 234 changes from a "zero" volt condition to a logical 1 or plus voltage condition. Simultaneously, the level at reset terminal 304 goes from a "zero" volt condition to a logical 1 condition. Together, this results in the de-energization of the presently energized circuit of FIG. 2 and the resetting thereof.

Within the time interval between this first transition of the update and reset outputs and the occurrence of leading edge 310, the multiplexing circuitry, based on the digital data received by converter 28, would reposition the update and reset outputs, 234 and 304 respectively, to the next drive circuit to be activated as determined by the received digital data.

This latter circuit would then receive the energizing pulses next occurring at the update output. This would result in the repositioning of the latter torque receiver to a position dictated by the received input data. Once the ripple counter counts its maximum number, eight in our particular embodiment, at the eighth transition, 316, the relaxation oscillator is "turned off" as described above. The update output 234 is then left at a "zero" volt level 318. This ensures that the then activated drive circuit is maintained in the energized position thus firmly locking the wheel position until the next data entry pulse is received.

With the appropriate design, one multitapped transformer could be used to supply the stator excitation voltages for the plurality of torque-receiver synchros driving the wheel grouping, 40.

It should be clear from a survey of the above table that the only difference between the two groups consisting of decimals 0–4 inclusive and 5–9 inclusive is a phase reversal. Therefore, it is also possible where the transformer is only driving a synchro associated with one wheel, to switch the phase at the primary of transformer 10, depending on the decimal indication to be displayed. Since this would require only two AC triac switches, the total requirement per wheel could be reduced from 10 to 7.

As implied above, other devices than the triac, may be used for the AC switches required to connect the excitation voltage to the stator windings. Transistors, dual SCR's, and relays are examples of alternate configurations. Additionally, light emitting diodes, packaged within the same package as the solid state AC switch, could provide a suitable means for activating the gates of the switches thereby turning them on.

Although a three-stage ripple counter was described, it is to be appreciated that the interconnection between the various flip flops can be arranged such that the number of pulses driving the rotor to its now position can be varied. It is the energy content of each pulse, considering a particular synchro's characteristics, which controls the number of pulses.

Other variations in the preferred embodiment described above may be readily apparent to those skilled in the art and are to be considered extensions of the invention described.

What is claimed is:

1. An electronic drive system for positioning torque receiver syncros which comprises:
   A. converter means for receiving position input data and converting said input data to a suitable code;

B. at least one multi-output transformer including:
      1. a primary winding connected to a primary a-c voltage, and
      2. a plurality of secondary windings producing a plurality of predetermined secondary a-c voltages;
   C. drive circuit means for connecting a particular group of said secondary a-c voltages to the stator windings of said syncros in response to said code, said drive circuit means comprising:
      1. a plurality of bi-directional switches coupling said secondary voltages and said syncro windings;
      2. bi-directional switch drive means including means for energizing said directional switches in response to said code, means for deenergizing said energizing means in response to said code and means for maintaining said bi-directional switches in the energized state after said torque receiver syncros have been positioned in response to said code;
      3. oscillator means for providing positioning pulses of predetermined frequency and pulse width;
      4. counter means for counting the number of positioning pulses generated, said counter means including means generating a turn-off signal when the number of positioning pulses reaches a predetermined number and means for initially resetting said counter means in response to said code;
      5. means for turning on said oscillator means in response to said code;
      6. means for turning off said oscillator means in response to said turn-off signals; and
      7. means responsive to said code for generating a predetermined number of the reset pulses, said reset pulses being fed to the deenergizing means of said bi-directional drive means.

2. An electronic drive system for positioning torque receiver signals which comprise:
   A. converter means for receiving position input data and converting said input data to a suitable code;

B. means for transforming a primary a-c voltage to a plurality of predetermined secondary a-c voltages; and
   C. drive circuit means for connecting a particular group of said secondary a-c voltages to the stator windings of said syncros in response to said code, said drive circuit means comprising:

1. a plurality of bi-directional switches connected between said secondary voltages and said syncro windings;
2. bi-directional switch drive means including means for energizing said bi-direction switches in response to said code and means for deenergizing said energizing means in response to said code;
3. means responsive to said code for generating a predetermined number of positioning pulses said positioning pulses being fed to said energizing means; and
4. means responsive to said code for generating a predetermined number of reset pulses, said reset pulses being fed to said deenergizing means.

3. The system of claim 2 wherein said positioning pulse generating means includes:
A. oscillator means for generating pulses of predetermined frequency and pulse width;
B. counter means for counting the number of pulses generated, said counter means including means for generating a turn-off signal when the number of said pulses reach said predetermined number;
C. means for turning on said oscillator means in response to said code; and
D. means for turning off said oscillator means in response to said turn-off signal.

4. The system of claim 3 which further comprises: means for initially resetting said counter means in response to said code.

* * * * *